US009668297B2

(12) United States Patent
Kamath et al.

(10) Patent No.: US 9,668,297 B2
(45) Date of Patent: May 30, 2017

(54) BLE SCATTERNET SYSTEM AND METHOD

(71) Applicant: Texas Instruments Incorporated, Dallas, TX (US)

(72) Inventors: Sandeep Kamath, San Diego, CA (US); Jason P. Kriek, Cranberry Township, PA (US); Gregory P. Stewart, San Diego, CA (US); Leonardo Estevez, Rowlett, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 78 days.

(21) Appl. No.: 13/958,271

(22) Filed: Aug. 2, 2013

(65) Prior Publication Data
US 2014/0355582 A1    Dec. 4, 2014

Related U.S. Application Data

(60) Provisional application No. 61/828,282, filed on May 29, 2013.

(51) Int. Cl.
*H04W 4/00* (2009.01)
*H04W 84/20* (2009.01)
(Continued)

(52) U.S. Cl.
CPC ........... *H04W 84/20* (2013.01); *H04W 4/008* (2013.01); *H04W 52/0216* (2013.01); *H04W 8/005* (2013.01)

(58) Field of Classification Search
CPC .................................................... H04W 4/008
(Continued)

(56) References Cited

U.S. PATENT DOCUMENTS 7,623,828 B2 * 11/2009 Block et al. ................. 455/41.2
7,756,067 B2 *  7/2010 Fujii et al. .................... 370/310
(Continued)

OTHER PUBLICATIONS

"Modeling of Current Consumption in 802.15.4/ZigBee Sensor Motes", by Eduardo Casilari et al., Sensors 2010, 10, pp. 5443-5468.
(Continued)

*Primary Examiner* — Guang Li
(74) *Attorney, Agent, or Firm* — John R. Pessetto; Charles A. Brill; Frank D. Cimino

(57) ABSTRACT

A BLE network includes a first piconet (A) including a first master scanner (3-1) and a first group of low-power slave/advertisers (5-1,2 . . . 5) for transmitting wireless advertisements and for establishing wireless connections with the first master/scanner. Circuitry (3,55) in the first master/scanner wirelessly scans to detect an advertisement (58,62) transmitted by a first slave/advertiser (5-1) of the first group and transmits a connection request (58,62) in response to the detecting, and transmits a schedule (60) for subsequent advertisements after an initial advertisement by the first slave/advertiser to complete synchronization of the first master/scanner with the first slave/advertiser. Circuitry (5,39) in the first slave/advertiser transmits the initial advertisement (42), receives an acceptance a resulting connection request, establishes association (44) with the first master scanner, and then causes the first slave/advertiser to go to sleep, to wake up and transmit subsequent advertisements according to the schedule (50) and accept resulting connection requests, and transmits available data to the first master/scanner, and goes back to sleep.

7 Claims, 8 Drawing Sheets

(51) Int. Cl.
*H04W 52/02* (2009.01)
*H04W 8/00* (2009.01)

(58) Field of Classification Search
USPC .......................................................... 370/338
See application file for complete search history.

(56) References Cited

U.S. PATENT DOCUMENTS

| | | | | |
|---|---|---|---|---|
| 7,826,420 | B2* | 11/2010 | Habetha et al. | 370/329 |
| 8,230,240 | B2* | 7/2012 | Diab et al. | 713/300 |
| 8,249,605 | B2* | 8/2012 | Niranjan | H04L 12/66 370/254 |
| 8,351,339 | B2* | 1/2013 | Zhen et al. | 370/248 |
| 8,675,688 | B2* | 3/2014 | Oh et al. | 370/509 |
| 8,798,617 | B1* | 8/2014 | Cole | H04W 8/005 455/404.2 |
| 2001/0029166 | A1* | 10/2001 | Rune | H04W 84/20 455/41.2 |
| 2002/0168943 | A1* | 11/2002 | Callaway, Jr. | H04B 17/318 455/67.11 |
| 2003/0031208 | A1* | 2/2003 | Anehem | H04W 28/14 370/474 |
| 2003/0076842 | A1* | 4/2003 | Johansson | H04L 12/24 370/401 |
| 2003/0099212 | A1* | 5/2003 | Anjum et al. | 370/328 |
| 2005/0002372 | A1* | 1/2005 | Rune | H04W 74/06 370/346 |
| 2007/0036105 | A1* | 2/2007 | Chun | H04W 16/14 370/329 |
| 2007/0076672 | A1* | 4/2007 | Gautier et al. | 370/338 |
| 2007/0160055 | A1* | 7/2007 | Takahashi | 370/395.2 |
| 2008/0117850 | A1* | 5/2008 | Agrawal et al. | 370/311 |
| 2008/0130603 | A1* | 6/2008 | Wentink | H04W 74/085 370/338 |
| 2008/0139212 | A1* | 6/2008 | Chen | H04W 72/1215 455/450 |
| 2008/0267147 | A1* | 10/2008 | Niranjan | H04W 8/005 370/338 |
| 2010/0097969 | A1* | 4/2010 | De Kimpe et al. | 370/311 |
| 2010/0182981 | A1* | 7/2010 | Thoukydides | H04J 3/0658 370/336 |
| 2010/0284380 | A1* | 11/2010 | Banerjee et al. | 370/338 |
| 2011/0021142 | A1* | 1/2011 | Desai | H04W 8/005 455/41.2 |
| 2012/0071098 | A1* | 3/2012 | Chebbo et al. | 455/41.2 |
| 2013/0109315 | A1* | 5/2013 | Polo | H04W 52/0274 455/41.2 |
| 2013/0223419 | A1* | 8/2013 | Ghosh et al. | 370/338 |
| 2015/0133054 | A1* | 5/2015 | Chen | H04W 74/002 455/41.2 |

OTHER PUBLICATIONS

"Energy Analysis of Neighbor Discovery in Bluetooth Low Energy Networks" by Jia Liu, et al., Radio Systems lab, Nokia Research Center, 11 pages.

\* cited by examiner

BLE SCATTERNET SYSTEM AND METHOD

CROSS REFERENCE TO RELATED APPLICATION

This application claims the benefit of prior filed U.S. provisional application Ser. No. 61/828,282 filed May 29, 2013, entitled "BLE SCATTERNET SYSTEM AND METHOD", by Sandeep Kamath, Jason P. Krieke, Gregory P. Stewart, and Leonardo Estevez, and incorporated herein by reference.

BACKGROUND OF THE INVENTION

The present invention relates generally to low energy BLE (Bluetooth Low Energy) networks, and more particularly to low power/low energy mechanisms and methods of establishing wireless connection between "nodes" of a scatternet or sensor network.

Those skilled in the art know that "Bluetooth" is a registered brand/trademark/certification mark for various wireless communication standards referred to herein as Bluetooth standards. The various Bluetooth standards have been developed and promulgated by the Bluetooth Special Interest Group known as "Bluetooth SIG". The various brands/trademarks/certification marks are owned and licensed to various users by Bluetooth SIG., Inc. for use on and in conjunction with various communication devices. Up-to-date Bluetooth guidelines can be obtained from the Bluetooth SIG, Inc. website "https//www.bluetooth.org/en-us". Proper authorized use of the Bluetooth brands/trademark/certification marks is enforced by Bluetooth SIG, Inc., in order to ensure that the standards are properly adhered to in accordance with the Bluetooth licensing terms and guidelines.

The Bluetooth Low Energy (BLE) brand/standard/certification mark is now called "Bluetooth Smart". The standard called "Bluetooth 4.0" incorporates the BLE or Bluetooth Smart standard. The term "classic Bluetooth" is used herein to refer to all versions of the Bluetooth standards prior to Bluetooth 4.0. All of the Bluetooth standards are developed by building certification standards/programs around certain parts of the IEEE 802.15.x family of specifications.

A "piconet" is basically a collection of slave/advertisers that are scanned by a master/scanner that could wirelessly connect to another piconet. A "scatternet" is a type of ad-hoc computer network consisting of two or more piconets. The terms "scatternet and "piconet are typically applied to Bluetooth wireless technology. Bluetooth Low Energy (BLE) is a feature of Bluetooth 4.0 wireless radio technology aimed principally at low-power and low-latency applications for wireless devices with a short range, up to approximately 160 feet, and facilitates a wide range of applications.

"Prior Art" FIG. 1 shows a conventional BLE scatternet including a piconet A and a piconet B each including a "master" or "master/scanner" device capable of wireless communication with a number of nearby "slave" or "slave/advertiser" devices. Bluetooth low energy (BLE) has the lowest power standard, and using BLE for the advertising of slave devices in a piconet provides the lowest known power consuming mechanism within the BLE standard. If it is desired to have the lowest power radio standard presently available, BLE is considered to be the starting point.

In piconet A, master/scanner 3-1 is capable of wireless communication with/advertisers 5-1, 5-2, 5-3, 5-4, and 5-5 through wireless links 2-1, 2-2, 2-3, 2-4, and 2-5, respectively. Similarly, in piconet B, master/scanner 10-2 is capable of wireless communication with/advertisers 5-6 and 5-7 through wireless links 2-6 and 2-7, respectively. Slave/advertiser 5-5 in piconet A also communicates with master 10-2 in piconet B through wireless link 7. In piconet A, master/scanner 3-1 can synchronize with any of the slave/advertisers in piconet A, for example as represented by reference numeral 15, to establish wireless link 2-1. After synchronization, master/scanner 3-1 then may perform two-way wireless data communication with the slave/advertiser, for example as represented by reference numeral 17. The BLE scatternet shown Prior Art FIG. 1 could include many more piconets that communicate with each other in essentially the manner described above. A shortcoming of the prior art shown in FIG. 1 is that it fails to accommodate piconet slave/advertiser devices which must operate with very little power/energy because of the requirements of the BLE standards.

If achieving very low power consumption is not a concern, so-called ZigBee technology with its existing standard can be used. The BLE standard is part of the Bluetooth 4.0 standard and is interoperable with most mobile phones. ZigBee is a protocol that combines with the MAC (Media Access Control) protocol established by IEEE 802.15.4. It has multiple operational modes. It has been shown that advertisement is the lowest energy technique for wireless communication between "nodes" of scatternets. However, the ZigBee standard is not operable in mobile phones. As far as the BLE standard is concerned, there is a "single mode", which is just the relatively new Bluetooth low energy mode of operation, and there also exists a "dual mode", which supports "classic" Bluetooth standard operation as well as operation in accordance with the BLE low energy standard. Modern smart phones usually support both in order to be able to wirelessly connect in both modes with older smart phones and new very low energy Bluetooth phones and devices, respectively.

The Bluetooth standard specifies standard connection time intervals that are established at the beginning of the time interval during which slave/advertiser devices connected in a piconet are allowed to wirelessly communicate with other devices, but the communication connection intervals typically are limited to approximately four seconds. Because of drift in the synchronization of internal crystal-generated clock signals in the slave/advertiser devices in a piconet, is necessary for every slave/advertiser device in the piconet to "wake up" into a high power consumption condition approximately every four seconds. Such high power consumption is unacceptable in some applications. If all the slave/advertisers need to be very low energy devices, then slave/advertisers would not ordinarily be used to aggregate data generated by the slave/advertiser devices in a piconet during their allowed advertising time intervals and then wirelessly connect to the master/scanner of a different piconet, as shown by link 7 in the prior art system shown in FIG. 1.

Thus, there is an unmet need for an economical, low-power/low-energy technique for automatically establishing wireless connections within a scatternet.

There also is an unmet need for an improved economical, low-power/low-energy technique for utilizing standardized BLE mechanisms in a scatternet.

There also is an unmet need for a more power-efficient way of propagating information through a series of BLE nodes in a quasi-static network.

There also is an unmet need for an improved, power-efficient way of synchronizing a master/scanner with a plurality of slave/advertisers in a piconet.

There also is an unmet need for an improved, power-efficient way of synchronizing a master/scanner in one piconet with a master/scanner in another piconet.

There also is an unmet need for a low-power/low-energy way of avoiding the need for every slave/advertiser in a piconet to periodically wake up irrespective of whether the slave/advertiser needs to transmit data.

There also is an unmet need for a low-power/low-energy way of propagating messages between BLE-enabled mobile wireless devices and sensors without requiring hardware changes or firmware changes to the BLE-enabled devices.

There also is an unmet need for a low-power/low-energy way of propagating messages between BLE-enabled mobile wireless devices and sensors while efficiently avoiding the effects of drift between internal clock signals in various slave/advertiser devices and master/scanner devices.

SUMMARY OF THE INVENTION

Is an object of the invention to provide an economical, low-power/low-energy technique for automatically establishing wireless connections within a scatternet.

It is another object of the invention to provide an improved economical, low-power/low-energy technique for utilizing standardized BLE mechanisms in a scatternet.

It is another object of the invention to provide a more power-efficient way of propagating information through a series of BLE nodes in a quasi-static network.

It is another object of the invention to provide an improved, power-efficient way of synchronizing a master/scanner with a plurality of slave/advertisers in a piconet.

It is another object of the invention to provide an improved, power-efficient way of synchronizing a master/scanner in one piconet with a master/scanner in another piconet.

It is another object of the invention to provide a low-power/low-energy way of avoiding the need for every slave/advertiser in a piconet to periodically wake up irrespective of whether the slave/advertiser needs to transmit data.

It is another object of the invention to provide a low-power/low-energy way of propagating messages between BLE-enabled mobile wireless devices and sensors without requiring hardware changes or firmware changes to the BLE-enabled devices.

It is another object of the invention to provide a low-power/low-energy way of propagating messages between BLE-enabled mobile wireless devices and sensors while efficiently avoiding the effects of drift between internal clock signals in various slave/advertiser devices and master/scanner devices.

Briefly described, and in accordance with one embodiment, the present invention provides a BLE network includes a first piconet (A) including a first master scanner (3-1) and a first group of low-power slave/advertisers (5-1,2 . . . 5) for transmitting wireless advertisements and for establishing wireless connections, respectively, with the first master/scanner. Circuitry (3,55) in the first master/scanner wireless scans to detect an advertisement (58,62) transmitted by a first slave/advertiser (5-1) of the first group and transmits a connection request (58,62) in response to the detecting, and transmits a schedule (60) for subsequent advertisements after an initial advertisement by the first slave/advertiser to thereby complete synchronization of the first master/scanner with the first slave/advertiser. Circuitry (5,39) in the first slave/advertiser transmits the initial advertisement (42), receives an acceptance a resulting connection request, establishing an association (44) with the first master scanner, and then causes the first slave/advertiser to go to sleep in a low-power mode, to wake up and transmit subsequent advertisements only according to the schedule (50), and to accept resulting connection requests from the first master/scanner if data is available to be advertised, transmitting the available data to the first master/scanner, and going back to sleep.

In one embodiment, the invention provides a BLE (Bluetooth low energy) network including a first piconet (A) including a first master scanner (3-1) and a first group of low-power slave/advertisers (5-1,2 . . . 5) for transmitting wireless advertisements and for establishing wireless connections, respectively, with the first master/scanner (3-1); circuitry (3 in FIG. 7, 55 in FIG. 10) in the first master/scanner (3-1) for wireless scanning to detect an advertisement (58,62 in FIG. 10) transmitted by a first slave/advertiser (5-1) of the first group (5-1,2 . . . 5) and transmitting a connection request (58,62 in FIG. 10) in response to the detecting, and transmitting a schedule (60 in FIG. 10) for subsequent advertisements after an initial advertisement by the first slave/advertiser (5-1) to thereby complete synchronization of the first master/scanner (3-1) with the first slave/advertiser (5-1); and circuitry (5 in FIG. 8, 39 in FIG. 9) in the first slave/advertiser (5-1) for transmitting the initial advertisement (42 in FIG. 9), receiving and accepting a resulting connection request, establishing an association (44 in FIG. 9) with the first master scanner (3-1), after which the first slave/advertiser (5-1) goes to sleep in a reduced power mode, waking up and transmitting subsequent advertisements only according to the schedule (50 in FIG. 9), and accepting resulting connection requests from the first master/scanner (3-1) if data is available to be advertised, transmitting the available data to the first master/scanner (3-1), and going back to sleep.

In a described embodiment, the connection request is the initial connection request and is transmitted by the first master/scanner (3-1) and is accepted and acknowledged by the first slave/advertiser (5-1) to establish association and synchronization between the first master/scanner (3-1) and the first slave/advertiser (5-1).

In one embodiment, the first slave/advertiser (5-1) accepts a connection request after the association has been established only if the first slave/advertiser (5-1) has data available to be advertised.

In one embodiment, the first master/scanner (3-1) transmits connection requests only if the advertisements meet a predetermined RSSI (received signal strength indicator) requirement. In one embodiment, accepting a connection request by the slave/advertiser (5-1) causes it to establish a temporary wireless connection between it and the first master/scanner (3-1).

In one embodiment, the schedule requires a predetermined number of allowed advertisements by the first slave/advertiser (5-1) before it initiates resynchronization of the first slave/advertiser (5-1) with the first master/scanner (3-1) to compensate drift between internal clock signals of the first slave advertiser (5-1) and the first master/scanner (3-1), respectively.

In one embodiment, the BLE low energy network includes circuitry (3 in FIG. 7) in the first master/scanner (3-1) for transmitting an advertisement containing aggregated data received from the first slave/advertiser (5-1) to a second master/scanner (3-2).

In one embodiment, the BLE low energy network includes circuitry (3 in FIG. 7) in the first (3-1) and second (3-2) master/scanners for selectively either (1) communicating the aggregated data to the second master/scanner (3-2)

according to a non-continuous predetermined schedule in a BLE mode of operation, or (2) communicating the aggregated data from the first slave/advertiser (5-1) to the second master/scanner (3-2) in a manner that is continuous and not according to a schedule.

In one embodiment, the BLE low energy network includes a second piconet (B) including the second master scanner (3-2) and a second group of low-power slave/advertisers (5-6,7) for transmitting wireless advertisements and establishing wireless connections, respectively, with the second master/scanner (3-2), the second piconet (B) also including circuitry (e.g., 3 in FIG. 7, 55 in FIG. 10) in the second master/scanner (3-2) for wireless scanning to detect an advertisement (58,62 in FIG. 10) transmitted by a second slave/advertiser (5-6) of the second group (5-6,7) and transmitting a connection request (58,62) in response to the detecting, and transmitting a schedule (60 in FIG. 10) for subsequent advertisements after an initial advertisement by the second slave/advertiser (5-6); and circuitry (5 in FIG. 8, 39 in FIG. 9) in the second slave/advertiser (5-6) for transmitting the initial advertisement (42 in FIG. 9), receiving and accepting a resulting connection request, establishing an association (44 in FIG. 9) with the second master scanner (3-2), and then causing the second slave/advertiser (5-6) to go to sleep in a low-power mode, waking up and transmitting subsequent advertisements only according to the schedule (50 in FIG. 9), and accepting resulting connection requests from the second master/scanner (3-2) if data is available to be advertised, transmitting the available data to the first master/scanner (3-2), causing the second slave/advertiser (5-6) to go back to sleep; and circuitry in the second master/scanner (3-2 in FIG. 5) for transmitting an advertisement containing aggregated data received from the first slave/advertiser (5-6) to a third master/scanner (3-3).

In one embodiment, the first master/scanner (3-1) operates to cull a connection with another master/scanner based on RSSI levels of advertisements received from the other master/scanner and the number of hops between master/scanners along a particular route required for aggregated data from the first slave/advertiser of the first group (5-1,2 . . . 5) to reach a destination of the aggregated data.

In one embodiment, the first slave/advertiser (5-1) can only advertise according to the schedule after the association and synchronization have been performed.

In one embodiment, the aggregated data is accumulated in a data packet that includes information identifying a slave/scanner that first advertised the aggregated data and also identifies an upstream destination of the aggregated data.

In one embodiment, if both the first master/scanner (3-1) and the second master/scanner (3-2) are transmitting the same particular set of aggregated data to a third master/scanner (3-3 in FIG. 5) and data loading of the second master/scanner (3-2) is greater than data loading of the first master/scanner (3-1), then the culling includes operating the third master/scanner (3-3) to cause the second master/scanner (3-2) to stop sending the particular set of aggregated data to the third master/scanner (3-3).

In one embodiment, BLE low energy network operates to perform repeated scanning and advertising operations of master/scanners along an established route including the first (3-1) and second (3-2) master/scanners until the aggregated data reaches a predetermined destination.

In one embodiment, the invention provides method for operating a BLE (Bluetooth low energy) network to reduce energy consumption, the method including providing a first piconet (A) including a first master scanner (3-1) and a first group of low-power slave/advertisers (5-1,2 . . . 5) for transmitting wireless advertisements and for establishing wireless connections, respectively, with the first master/scanner (3-1); operating a first slave/advertiser (5-1) of the first group (5-1,2 . . . 5) to transmit an initial advertisement (42 in FIG. 9); operating the first master/scanner (3-1) in a scanning mode to detect the initial advertisement (58,62 in FIG. 10) and to transmit a corresponding connection request (58,62 in FIG. 10) in response to the detecting; operating the first slave/advertiser (5-1) to receive and accept the corresponding connection request (58,62 in FIG. 10) and establish an association (44 in FIG. 9) with the first master scanner (3-1); operating the first master/scanner (3-1) to transmit to the first slave/advertiser (5-1) a schedule (60 in FIG. 10) for subsequent advertisements to thereby synchronize (44 in FIG. 9) the first master/scanner (3-1) with the first slave/advertiser (5-1), and then causing the first slave/advertiser (5-1) go to sleep (48 in FIG. 9) in a low-power mode (52 in FIG. 9); operating the first slave/advertiser (5-1) to wake up and transmit (50 in FIG. 9) subsequent advertisements only according to the schedule and operating the first master/scanner (3-1) to simultaneously scan for the subsequent advertisements (62 in FIG. 10) according to the schedule (60 in FIG. 10) and transmit connection requests corresponding to the subsequent advertisements, and operating the first slave/advertiser (5-1) to accept the corresponding connection requests (44 in FIG. 9) from the first master/scanner (3-1) if the first slave/advertiser (5-1) has data available to be advertised; and operating the first slave/advertiser (5-1) to advertise the available data (50 in FIG. 9) to the first master/scanner (3-1) and operating the first master/scanner (3-1) to aggregate the advertised available data (62 in FIG. 10).

In one embodiment, the method includes operating the first master/scanner (3-1) to transmit connection requests only if the advertisements meet a predetermined RSSI (received signal strength indicator) requirement (58 in FIG. 10).

In one embodiment, the schedule requires a predetermined number of allowed advertisements by the first slave/advertiser (5-1) before it initiates resynchronization (46 in FIG. 9) of the first slave/advertiser (5-1) with the first master/scanner (3-1) to compensate drift between internal clock signals of the first slave advertiser (5-1) and the first master/scanner (3-1), respectively.

In one embodiment, the method includes a second piconet (B) including a second master scanner (3-2) and a second group of low-power slave/advertisers (5-6,7) for transmitting wireless advertisements and establishing wireless connections, respectively, with the second master/scanner (3-2), the second piconet (B) being substantially similar to the first piconet (A).

In one embodiment, the method includes operating the first master/scanner (3-1) to cull a connection with another master/scanner based on RSSI levels of advertisements received from the other master/scanner and the number of hops between master/scanners along a particular route required for aggregated data from the first slave/advertiser of the first group (5-1,2 . . . 5) to reach a destination of the aggregated data (64 in FIG. 10).

In one embodiment, the culling includes operating the first master/scanner (3-1) to command another master/scanner having heavy data loading to stop sending redundant data to the first master/scanner (3-1).

In one embodiment, the method includes repeating scanning and advertising operations of master/scanners along an established route until the aggregated data reaches a predetermined destination.

In one embodiment, the invention provides a system for operating a BLE (Bluetooth low energy) network to reduce energy consumption, including a first piconet (A) including a first master scanner (3-1) and a first group of low-power slave/advertisers (5-1,2 . . . 5) for transmitting wireless advertisements and for establishing wireless connections, respectively, with the first master/scanner (3-1); means (28-2,42) for operating a first slave/advertiser (5-1) of the first group to transmit an initial advertisement (42); means (28-1,58) for operating the first master/scanner (3-1) in its scanning mode to detect the initial advertisement (58,62) and to transmit a corresponding connection request (58,62) in response to the detecting; means (28-2,44) for operating the first slave/advertiser (5-1) to receive and accept the corresponding connection request and establish an association (44) with the first master scanner (3-1); means (28-1,60) for operating the first master/scanner (3-1) to transmit to the first slave/advertiser (5-1) a schedule (60) for subsequent advertisements to thereby synchronize the first master/scanner (3-1) with the first slave/advertiser (5-1), and means (28-2,48,52) for then causing the first slave/advertiser (5-1) go to sleep in a low-power mode; means (28-2,46) for operating the first slave/advertiser (5-1) to wake up and transmit subsequent advertisements only according to the schedule and means (28-1,62) for operating the first master/scanner (3-1) to simultaneously scan for the subsequent advertisements according to the schedule (50), means (28-1,62) for operating the first master/scanner (3-1) to transmit connection requests corresponding to the subsequent advertisements, and means (28-2,5) for operating the first slave/advertiser (5-1) to accept the corresponding connection requests from the first master/scanner (3-1) if the first slave/advertiser (5-1) has data available to be advertised; and means (28-2,46) for operating the first slave/advertiser (5-1) to advertise the available data to the first master/scanner (3-1) and means (28-1,62) for operating the first master/scanner (3-1) to aggregate the advertised available data.

In one embodiment, the system includes means (28-1,58) for operating the first master/scanner (3-1) to transmit connection requests only if the advertisements meet a predetermined RSSI (received signal strength indicator) requirement.

DETAILED DESCRIPTION OF THE PREFERRED EMBODIMENTS

Figure 2:
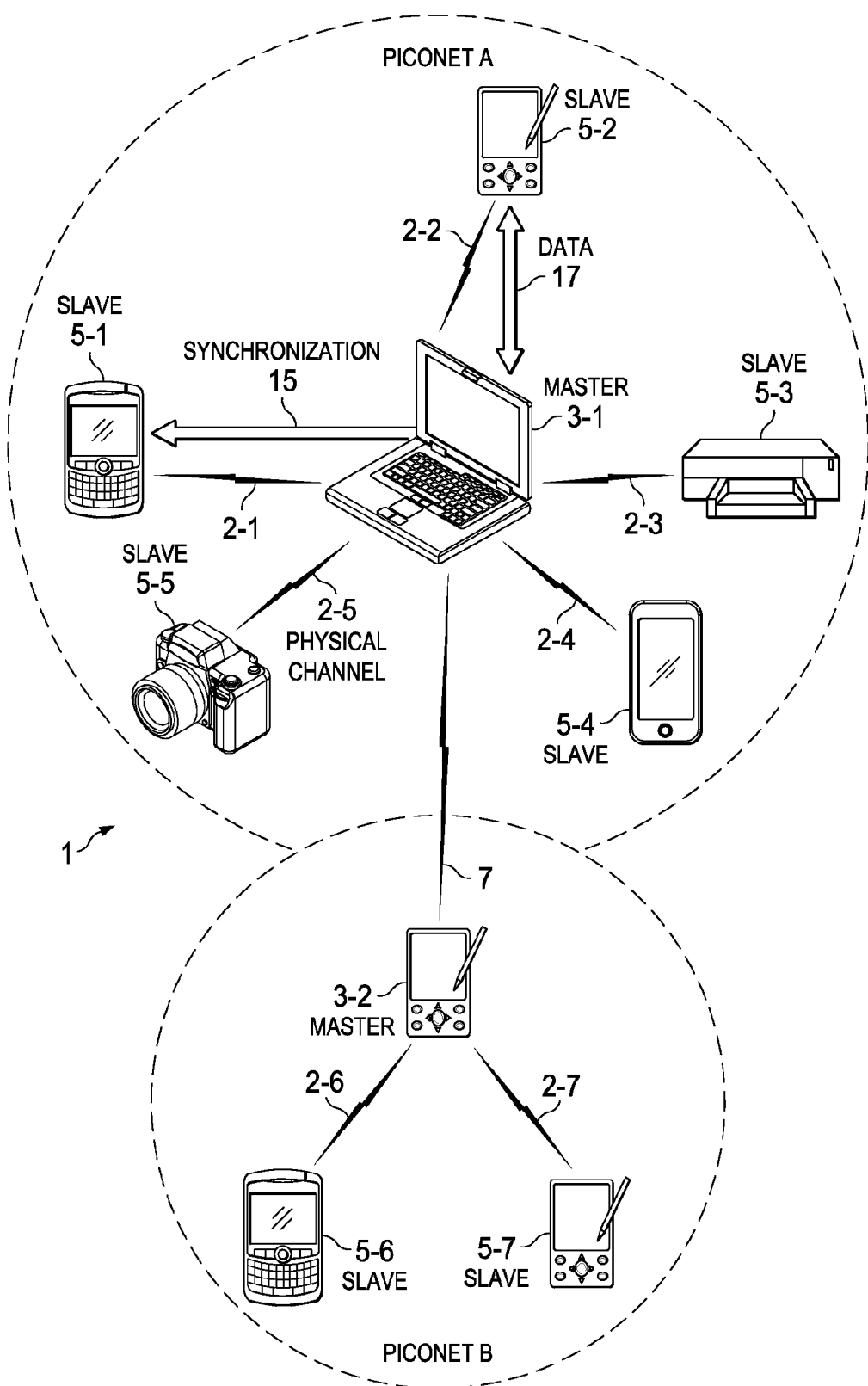
FIG. 2 is a diagram illustrating communication between a pair of piconets in accordance with the present invention.

FIG. 2 shows an improved, very low-power scatternet 1 including a piconet A and a piconet B each including a master/scanner device capable of wireless communication with a number of nearby slave/advertiser devices. In piconet A, master/scanner 3-1 is capable of wireless communication with advertisers 5-1, 5-2, 5-3, 5-4, and 5-5 through wireless links 2-1, 2-2, 2-3, 2-4, and 2-5, respectively. Similarly, in piconet B, master/scanner 10-2 is capable of wireless communication with advertisers 5-6 and 5-7 through wireless links 2-6 and 2-7, respectively. Each slave/advertiser can have a wireless link with only one master/scanner. Each slave/advertiser and each master/scanner includes at least a transceiver and a processor with integrated memory running the BLE protocol stack. The BLE protocol stack consists of software that implements the BLE protocol as defined by the Bluetooth 4.0 core specification.

Figure 7:
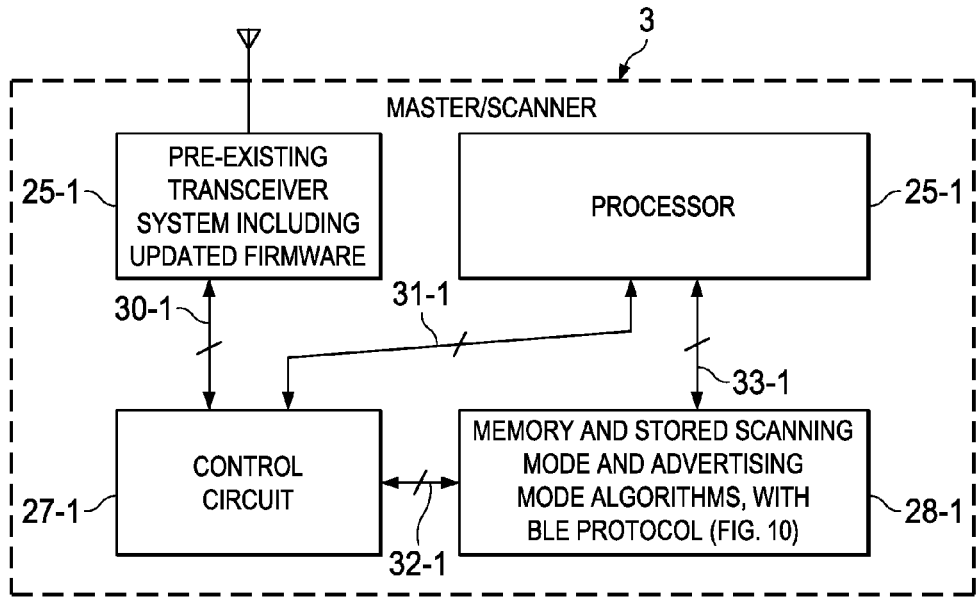
FIG. 7 is a block diagram of a master/scanner as shown in FIG. 2.

As shown in FIG. 7, a master/scanner 3 of the kind shown in FIG. 2 includes a transceiver system 25-1 coupled by a bus 30-1 to a control circuit 27-1. Control circuit 27-1 is connected by a bus 31-1 to a processor 26-1, which is connected by a bus 33-1 to a block 28-1 including a memory and stored scanning mode and advertiser mode algorithms along with stored standard BLE 4.0 protocol information. Block 28-1 is coupled by bus 32-1 to control circuit 27-1. Everything in master/scanner 3 may be conventional, except for updated firmware in transceiver system 25-1, which may be a pre-existing transceiver system. The updated firmware enables master/scanner 3 to operate in accordance with the slave-master association and synchronization methodology subsequently described herein and also enables master/scanner 3 to operate in accordance with the master/scanner-to-master/scanner synchronization and culling methodology subsequently described herein.

Figure 8:
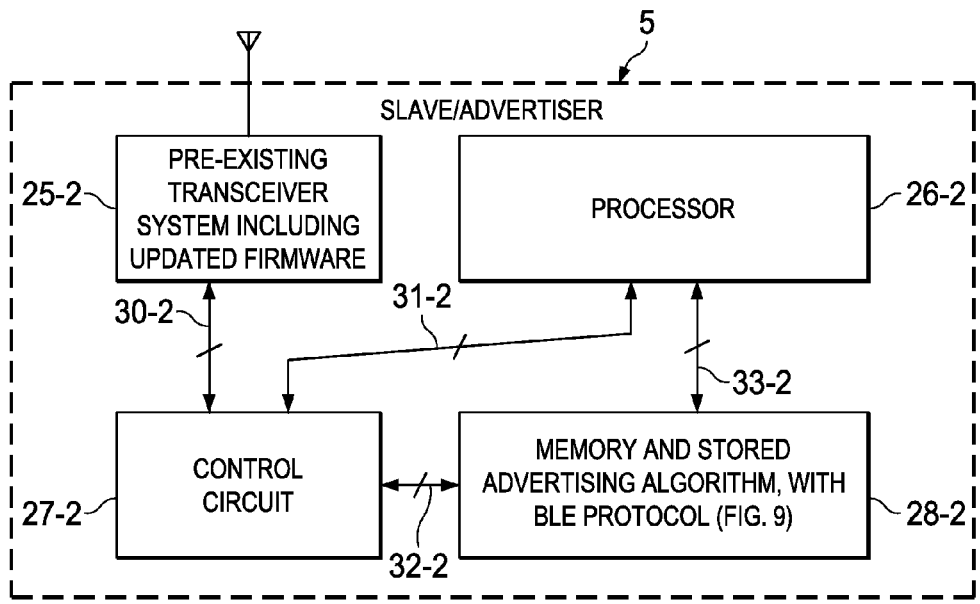
FIG. 8 is a block diagram of a slave/advertiser as shown in FIG. 2.

Similarly, and as shown in FIG. 8, a slave/advertiser 5 of the kind shown in FIG. 2 includes a transceiver system 25-2 coupled by a bus 30-2 to a control circuit 27-2. Control circuit 27-2 is connected by a bus 31-2 to a processor 26-2, which is connected by a bus 33-2 to a block 28-2 including a memory and stored scanning mode and advertiser mode algorithms along with stored standard BLE 4.0 protocol information. Block 28-2 is coupled by bus 32-2 to control circuit 27-2. Everything in slave/advertiser 5 may be conventional, except for updated firmware in transceiver system 25-2, which may be a pre-existing transceiver system. The updated firmware enables slave/advertiser 5 to operate in accordance with the slave-master association and synchronization methodology subsequently described herein and also enables slave/advertiser 5 to operate in accordance with the slave/advertiser-to-master/scanner association and synchronization methodology subsequently described herein.

Master/scanner 3-1 in piconet A communicates with master 3 in piconet B through a wireless link 7. In piconet A, master/scanner 3-1 can synchronize with any of the slave/advertisers 5-1,2 . . . 5 in piconet A, for example to establish wireless link 2-1 with slave/advertiser 5-1 as indicated by reference numeral 15, and then may perform two-way wireless data communication with a slave/advertiser, for example with slave/advertiser 5-2 as indicated by reference numeral 17. That is, piconet A is basically a collection of slave/advertisers that are scanned by master/scanner 3-1 which can also wirelessly connect to the master/scanner 3-2 of piconet B. Scatternet 1 could include many more piconets that communicate with each other in essentially the same manner.

In piconets such as A and B, all of the master/scanner devices are "powered" devices, which means that they all are powered by a corresponding power supply that is sufficient to allow the master/scanner to operate continuously. Each slave/advertiser device is a very low-power device supplied by its power supply (such as a small battery or a small solar panel or other energy harvester) that does not need to be capable of allowing continuous operation of the slave/advertiser device. The slave/advertiser needs to spend a substantial amount of time in a "sleep" mode to conserve its energy source for operation when the slave/advertiser wakes up. (For example, a slave/advertiser may have a rechargeable battery and a very small solar panel (e.g., approximately 1 centimeter squared), so the slave/advertiser has a very "tight" energy budget, whereas the master/scanner may have a much larger solar panel and rechargeable batteries that enable it to operate continuously. The slave/advertiser periodically wakes up and sends out an advertisement.

Each master/scanner acknowledges the advertisement by transmitting a connection request, and if the slave/advertiser wants to have more elaborate communication, the connection request is accepted by the slave/advertiser and a temporary wireless connection between the slave/advertiser and the master/scanner is established. (If the slave/advertiser tries to send an advertisement at other times, the master/scanner will not acknowledge it; and the slave/advertiser will connect with the master/scanner only after the slave/advertiser wakes up at its next scheduled time.)

Figure 1:
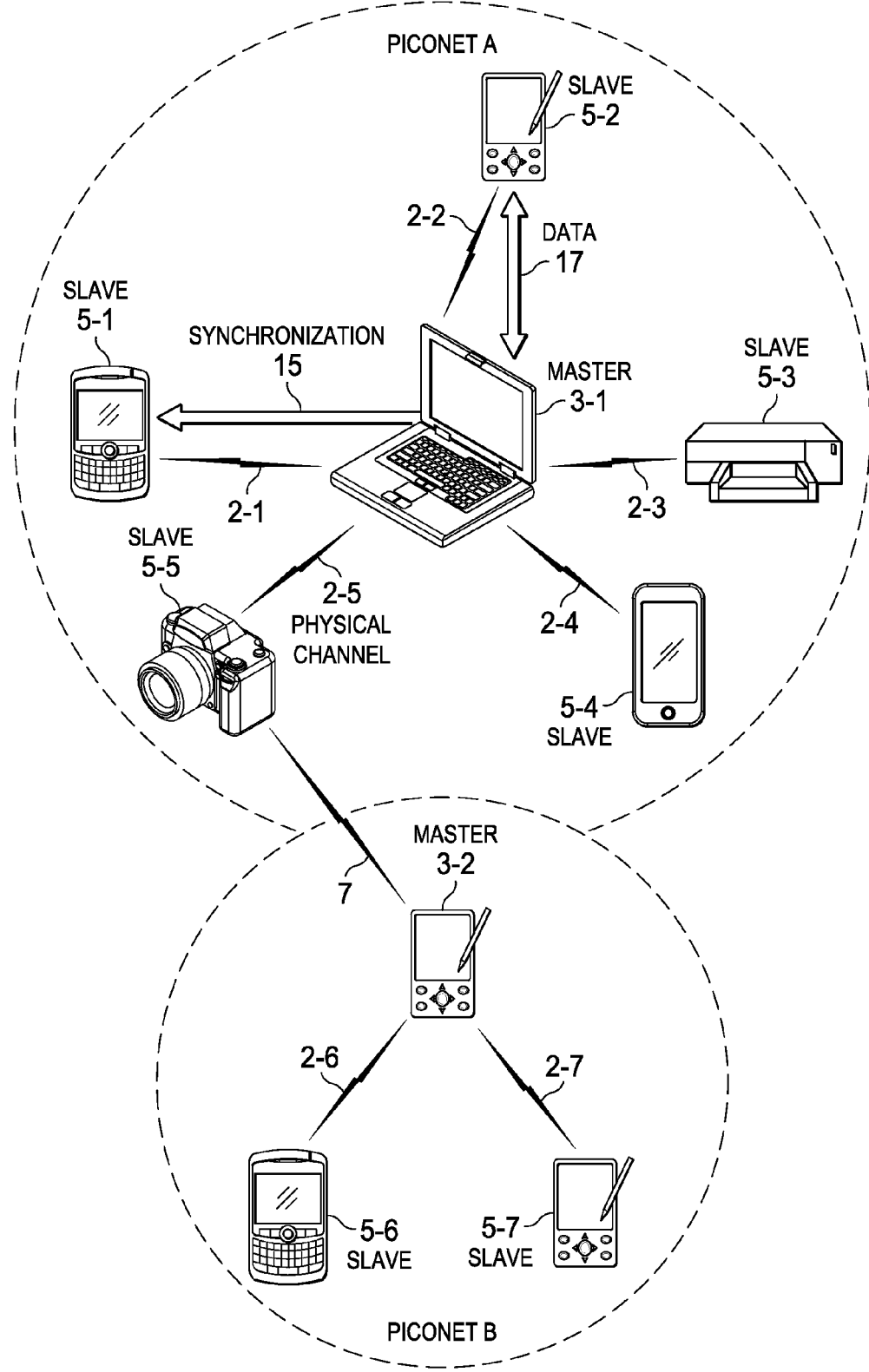
FIG. 1 is a diagram illustrating conventional communication between a pair of piconets.

Slave/advertisers in a piconet are very low energy devices which would not ordinarily be used to aggregate data generated by other slave/advertisers and then connect to the master/scanner of a different piconet as shown in the network of Prior Art FIG. 1.

The BLE standard is utilized as a starting point for the method subsequently described with reference to FIGS. 3-6 because the lowest-power available radio standard for wireless communication is needed in order to maintain interoperability with various Bluetooth devices such as "smart phones". In the method of operation of piconets A and B in FIG. 2, each slave/advertiser initially transmits an advertisement whenever it "wishes", irrespective of any predetermined time intervals and/or frequency or "periodicity", and in response the master/scanner of each piconet initially is "associated" with each slave/advertiser in the piconet, and then "dictates" the starting time and duration of future advertisements by that slave/advertiser during a process of synchronization with of that slave/advertiser. The master/scanner then knows when to "wake up" to scan for advertisements by the various slave/advertisers in the piconet. This avoids the need for every slave/advertiser to periodically wake up (for example, every 4 seconds) to advertise as required by standard BLE operation, and thereby avoids the periodic power consumption that would otherwise occur during pre-scheduled periodic wake-up intervals during which the slave/advertiser has nothing to advertise.

Also, as subsequently explained, after a predetermined number of advertisements by a slave/advertiser, the master/scanner must "resynchronize" with the slave/advertiser to compensate "drift" between the internal clock signals of the master/scanner and the slave/advertiser.

Figure 3:
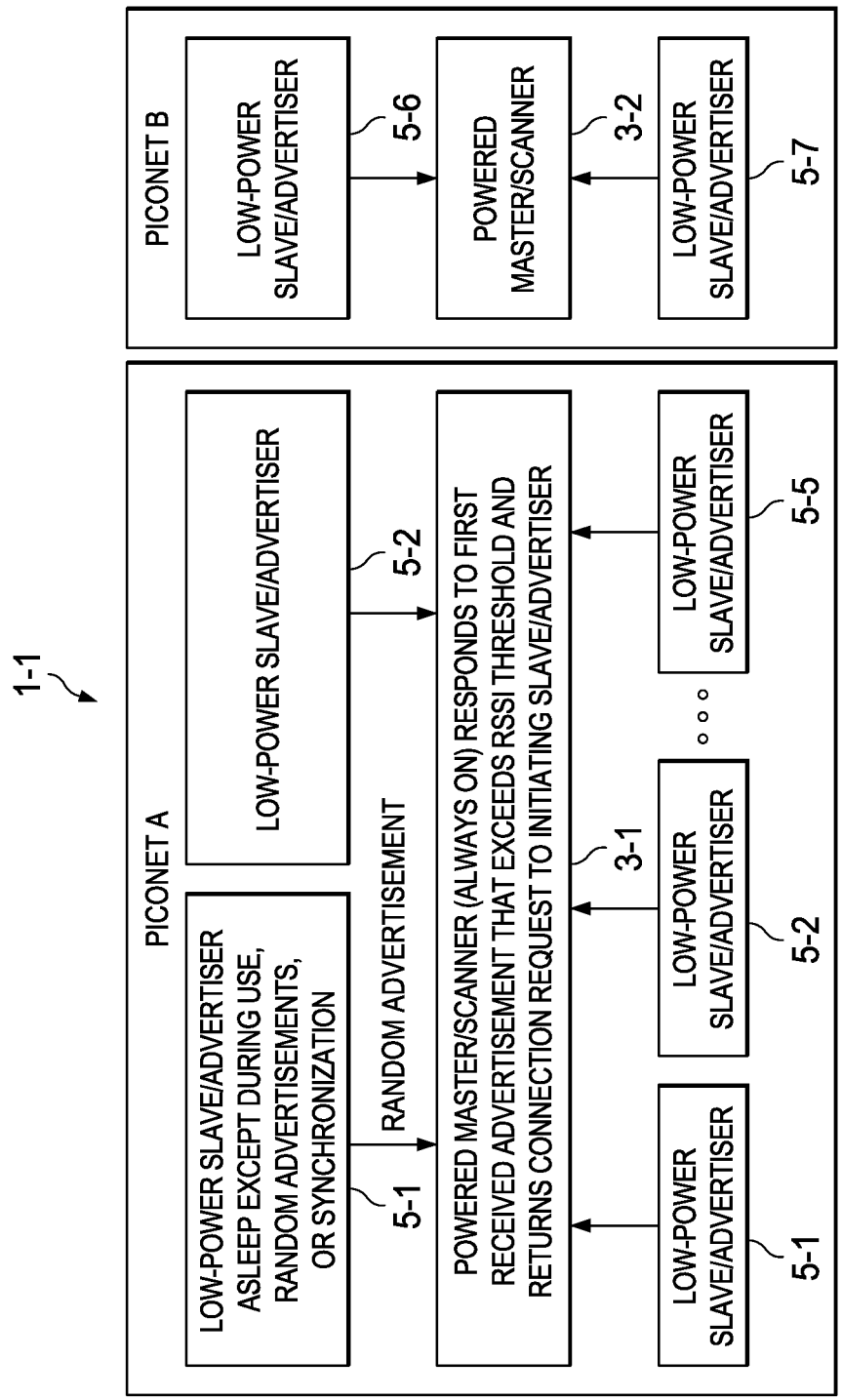
FIG. 3 is a diagram illustrating a BLE sensor net low-power association process during operation of the piconets of FIG. 2.

FIG. 3 shows a configuration 1-1 of scatternet 1 in FIG. 2 wherein the very low power slave/advertisers 5-1, 5-2, . . . 5-5 in piconet A similarly become associated with master/scanner 3-1, and wherein the very low power slave/advertisers 5-6 and 5-7 in piconet B become "associated" with master/scanner 3-2. The wirelessly transmitted advertisements by low-power slave/advertisers 5-1, 5-2, . . . 5-5, respectively, occur prior to becoming associated at unsynchronized or somewhat random times, and master/scanner 3-1 responds to the first such advertisement having a signal strength that exceeds a predetermined RSSI (Received Signal Strength Indicator) threshold by sending a "connection request" to the originating slave/advertiser. Master/scanner 3-1 then initiates a synchronization procedure to synchronize and thereby "associate" that first slave/advertiser with master/scanner 3-1. The other slave/advertisers in piconet A eventually also become associated with master/scanner 3-1 in the same manner. Similarly, low-power slave/advertisers 5-6 and 5-7 in piconet B eventually become associated with master/scanner 3-2 in essentially the same way.

A low-power network or piconet "node" is referred to herein as a slave/advertiser, although technically the node is not considered to be a slave until a wireless communication connection is actually established with a master/scanner. Also, a network or piconet node is not technically considered to be a master/scanner until a wireless connection is established between it and a slave/advertiser.

At the beginning of a relevant time interval, all of the slave/advertisers initially are advertising during unsynchronized intervals and have the ability to "associate" with any master/scanner that is close enough for a valid wireless connection with the slave/advertisers. A slave/advertiser is said to be "associated" with a master/scanner after it has established a wireless connection with that master/scanner. There is a suitable predetermined threshold for a conventional RSSI which must be exceeded by the transmitted advertisement signals as they are received by the master/scanner, in order to establish a valid wireless connection with a master/scanner. If a particular slave/advertiser is the first slave/advertiser to meet the RSSI threshold of a particular master/scanner, that master/scanner sends back a "connection request". The connection request is sent from the master/scanner to a slave/advertiser in response to an advertisement by the slave/advertiser in order to schedule periodic wake-up times and communication times in accordance with a BLE standard. Note that a master/scanner is in its scanning mode both while it receives/detects an advertisement and also when it sends a connection request.

The slave/advertiser then establishes an initial connection with that master/scanner and thereby becomes associated with that master/scanner. A slave/advertiser can associate with only one master/scanner, and cannot wirelessly connect to any other master/scanner. (Also, an "associated" slave/advertiser can not wirelessly connect to another slave/advertiser.) As soon as the slave/advertiser becomes associated with the master/scanner, the master/scanner dictates or imposes a schedule of starting times or periodicity of starting times of pre-established time intervals during which the slave/advertiser must transmit its subsequent advertisements whenever it has data available to transmit. If the slave/advertiser has no data available to transmit, it can immediately go back to its very-low-power "sleep" mode.

The master/scanner knows when to go into its scanning mode according to the above-mentioned schedule it imposed in order to receive subsequent advertisements from the associated slave/advertiser. Initially, the master/scanner wirelessly and continuously scans and detects any slave advertisement and in response transmits a corresponding connection request. The slave/advertiser wirelessly connects with the master/scanner to receive the connection request and then the master/scanner transmits the advertisement "schedule". If the slave/advertiser has more data to send, it will "accept" a connection request received after the subsequent advertisement. Otherwise, the slave/advertiser will just put its present data in the advertisement packet and use the connection request as an acknowledgment. If a connection request is not received after the advertisement, the slave/advertiser retransmits the advertisement and accepts a resulting responsive subsequent connection request transmitted by the master/scanner. If the master/scanner wishes to send data to a slave/advertiser, the master/scanner does not send a connection request following the advertisement. The master/scanner subsequently sends the data through the established wireless connection according to the pre-established schedule. Master/scanners can advertise aggregated data to other master/scanners during previously established advertisement periods that have been "agreed upon" with those master/scanners. (See the flow chart in subsequently described FIG. 9.)

It should be understood that the two piconets together represent a "static environment", meaning that neither the master/scanners nor slave/advertisers are physically moving. Once the master/scanner of a piconet has scanned for a sufficiently long amount of time, it utilizes remaining available time intervals (which have not been allocated for the purpose of scanner-to-slave/advertiser synchronization) to function in its own advertising mode so that it can wirelessly connect with and synchronize with master/scanners of other piconets. It also should be understood that all of the slave/advertisers and the master/scanner in a piconet are originally unsynchronized and the slave/advertisers initially are advertising at somewhat random, unsynchronized times according to the needs of the various slave/advertisers. When each slave/advertiser wirelessly connects to and becomes associated with a particular master/scanner, that slave/advertiser and that master/scanner must become synchronized with each other. Also, each master/scanner in each piconet functions in arranging its various wireless connections in a way that minimizes the number of times that the master/scanner needs to occasionally resynchronize with its various slave/advertisers, respectively, to avoid the effects of drift between its internal clock signal phase and the internal clock signal phase of its associated slave/advertisers and also leaves a sufficiently large remaining time interval to allow the master/scanner to advertise to master/scanners of other piconets. During the master-to-slave synchronization procedure, the master/scanner dictates to an associated slave/advertiser when it is to wake up and start its next advertisement and how much time is allowed for that advertisement. (Those values typically are determined initially by a centrally controlled network to the piconets, and can be updated.)

The information in the advertisement packet indicates that the packet is being transmitted by a master/scanner that wants to connect to the master scanner of another piconet. (An advertisement contains 32-39 bytes of data in an advertisement packet for transmission by a master/scanner.) Other such master/scanners that are close enough to receive the transmitted advertisement packet signal then recognize that it has been transmitted from a master/scanner rather than a slave/advertiser and can, if appropriate RSSI signal criteria are met, synchronize and establish a wireless connection between the master/scanners. This process continues until all master/scanners within range of each other synchronize and establish wireless connections with each other, achieving what is referred to as "full connection" of the piconets.

Figure 9:
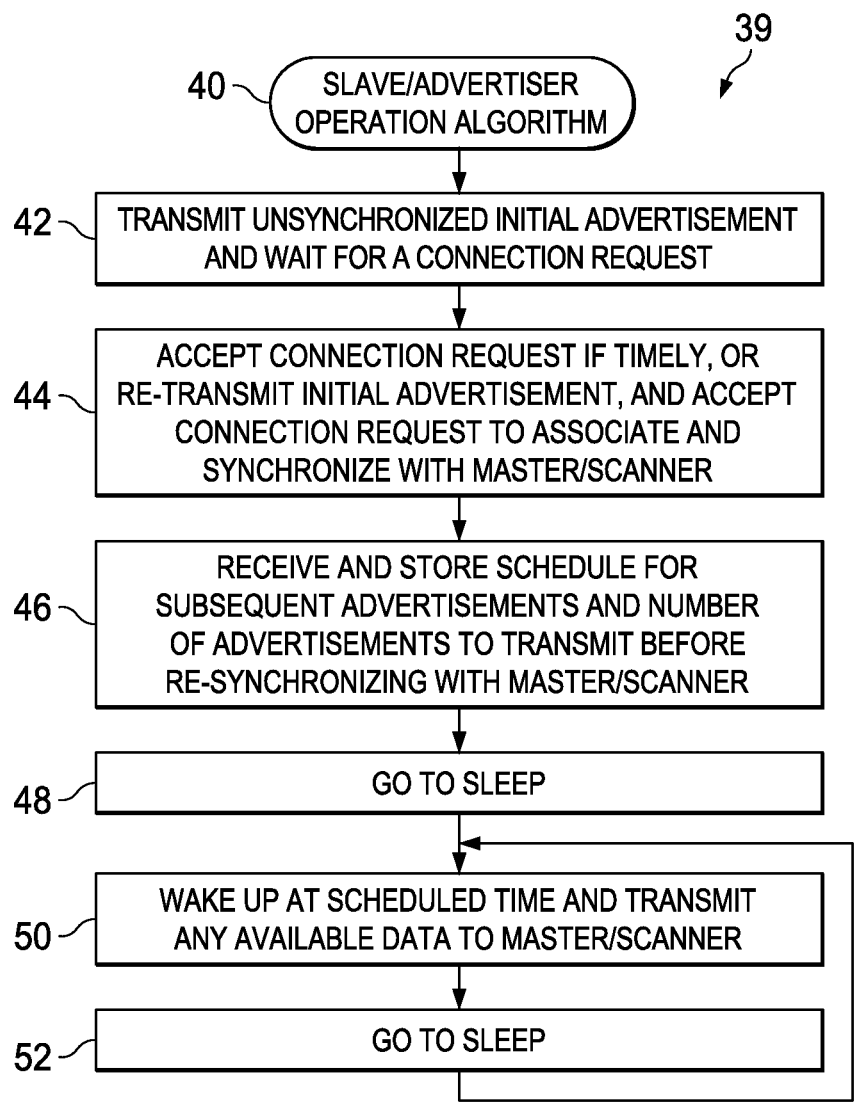
FIG. 9 is a flowchart of an operating algorithm for a slave/advertiser.

As indicated in the flowchart of FIG. 9, reference numeral 39 designates an embodiment of an operating algorithm stored in block 28-2 of slave/advertiser 5 in FIG. 8. Slave/advertiser algorithm 39 begins at label 40 in FIG. 9. The slave/advertiser transmits an unsynchronized initial advertisement and waits for a connection request, as indicated in block 42. Then, as indicated in block 44, if the slave/advertiser 5 receives a timely connection request from a master/scanner which has received the initial advertisement, the slave/advertiser 5 in FIG. 8 may accept the connection request and thereby do its part to associate with and synchronize with the master/scanner. If the slave/advertiser 5 does not receive a timely connection request, it waits for an appropriate amount of time and re-transmits the initial advertisement. As indicated in block 46, once the association of the slave/advertiser 5 in FIG. 8 with the master/scanner has been accomplished, the slave/advertiser 5 then receives and stores a schedule for subsequent advertisements (along with a predetermined number of advertisements which the slave/advertiser 5 must perform before a re-synchronization operation must be performed), in order to complete the association and synchronization (or re-synchronization) with the master/scanner. Then the algorithm goes to block 48 and causes the slave/advertiser 5 in FIG. 8 to go to sleep into a very low power mode. After that, the slave/advertiser 5 wakes up only periodically at the scheduled times, and advertises or transmits any available data it has to the associated master/scanner, as indicated in block 50, and then goes back to sleep as indicated in block 52.

Figure 4:
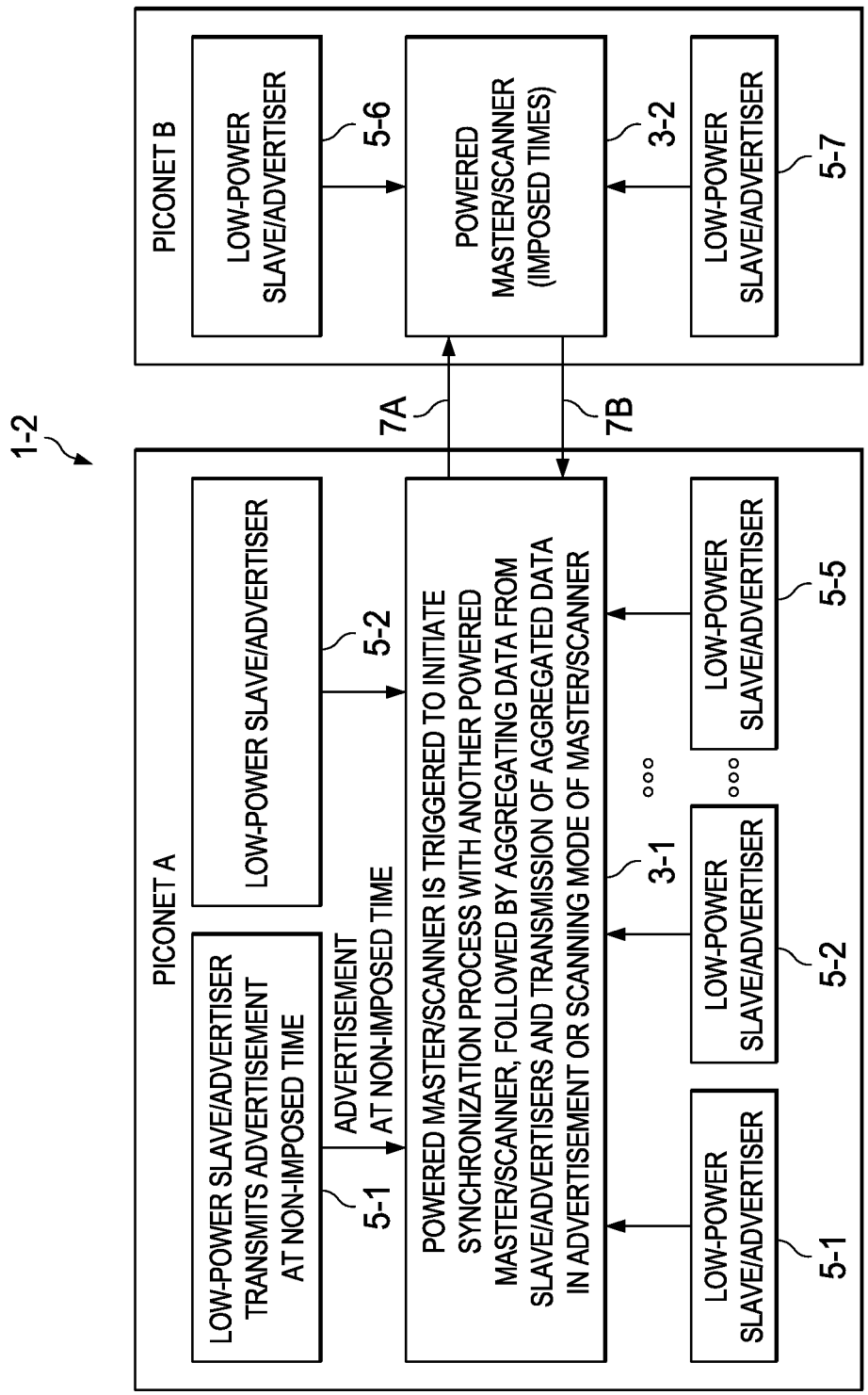
FIG. 4 is a diagram illustrating a BLE sensor scanning synchronization process during operation of the piconets of FIG. 2.

FIG. 4 shows a configuration 1-2 of scatternet 1 in FIG. 2 wherein "powered" master/scanner 3-1 in piconet A becomes "synchronized" with master/scanner 3-2 in piconet B. Wireless connection 7 between master/scanners 3-1 and 3-2 in FIG. 2 is shown in FIG. 4 to include wireless signal 7A transmitted from master/scanner 3-1 to master/scanner 3-2 and wireless signal 7B transmitted from master/scanner 3-2 to master/scanner 1. The scanner synchronization procedure includes master/scanner 3-1 going into its advertising mode after it has aggregated data which it has received from any of its various slave/advertisers 5-1,2 . . . 5 to transmit or forward the received and aggregated data to other master/scanners outside of piconet A in advertisement packets at previously agreed-upon advertisement time intervals. A master/scanner acts as an advertiser when sending such aggregated advertisement data to another master/scanner. This process of advertising data by slave/advertisers at the scheduled times, reception and aggregation of the advertised data by an associated master/scanner, and advertising or relaying of the aggregated data packets by the "associated" master/scanner to another master/scanner, is repeated until the data is received by a master/scanner that is connected to a wired or non-BLE network such as a Wi-Fi network.

In FIG. 4, signal 7A is transmitted by master/scanner 3-1 during a "non-established" or "non-negotiated" or "random" low-power time interval to trigger a two-way process by means of which the point in time is established at which the master/scanner 3-1 will be advertising or transmitting aggregated data and the master/scanner 3-2 will be scanning or receiving data. After this scanner synchronization process is complete, master/scanner 3-1 can aggregate data from any of the various slave/advertisers in piconet A and transmit it to master/scanner 3-2, which transmits the aggregated data in an advertisement (i.e., an advertisement packet or a standard connection interval packet) to the master/scanner of another piconet or to an upstream network.

Once the master/scanner of a particular piconet has synchronized with all of its slave/advertisers that still include a "request for association" message in an un-sent advertisement, then the master/scanner starts sending out advertisements to other master/scanners during the above-mentioned remaining time interval. During that period of time, master/scanners of other piconets may receive such advertisements in new or already-established wireless connections.

In FIG. 4, wireless connections 7-1 and 7-2 are established between the two master/scanners 3-1 and 3-2. Time intervals are established wherein each master/scanner can function as a scanner, respectively, during a corresponding particular time interval and during corresponding remaining time intervals each master/scanner can function as an advertiser. That enables master/scanners 3-1 and 3-2 to send or exchange aggregated data in multiple packets between each other, one via the upstream wireless connection 7-1 and the other via the downstream wireless connection 7-2. At that point, wireless connection time intervals can be established during which a master/scanner that has aggregated data can forward it to the master/scanner of another piconet or to an upstream network. For example, if the connection intervals are established to be 30 seconds and master/scanner 3-2 wants to receive aggregated data from any of the slave/advertisers 5-1,2 . . . 5 in piconet A, then master/scanner 3-2 in piconet B will, at the assigned periodicity or frequency, establish a wireless connection with master/scanner 3-1 and transmit its aggregated data to master/scanner 3-2. Master/scanner 3-1 in piconet A will also accept any other aggregated data that master/scanner 3-2 in piconet B has available for any of the slave/advertisers of master/scanner 3-1 and then redistribute that data to those slave/advertisers.

Figure 10:
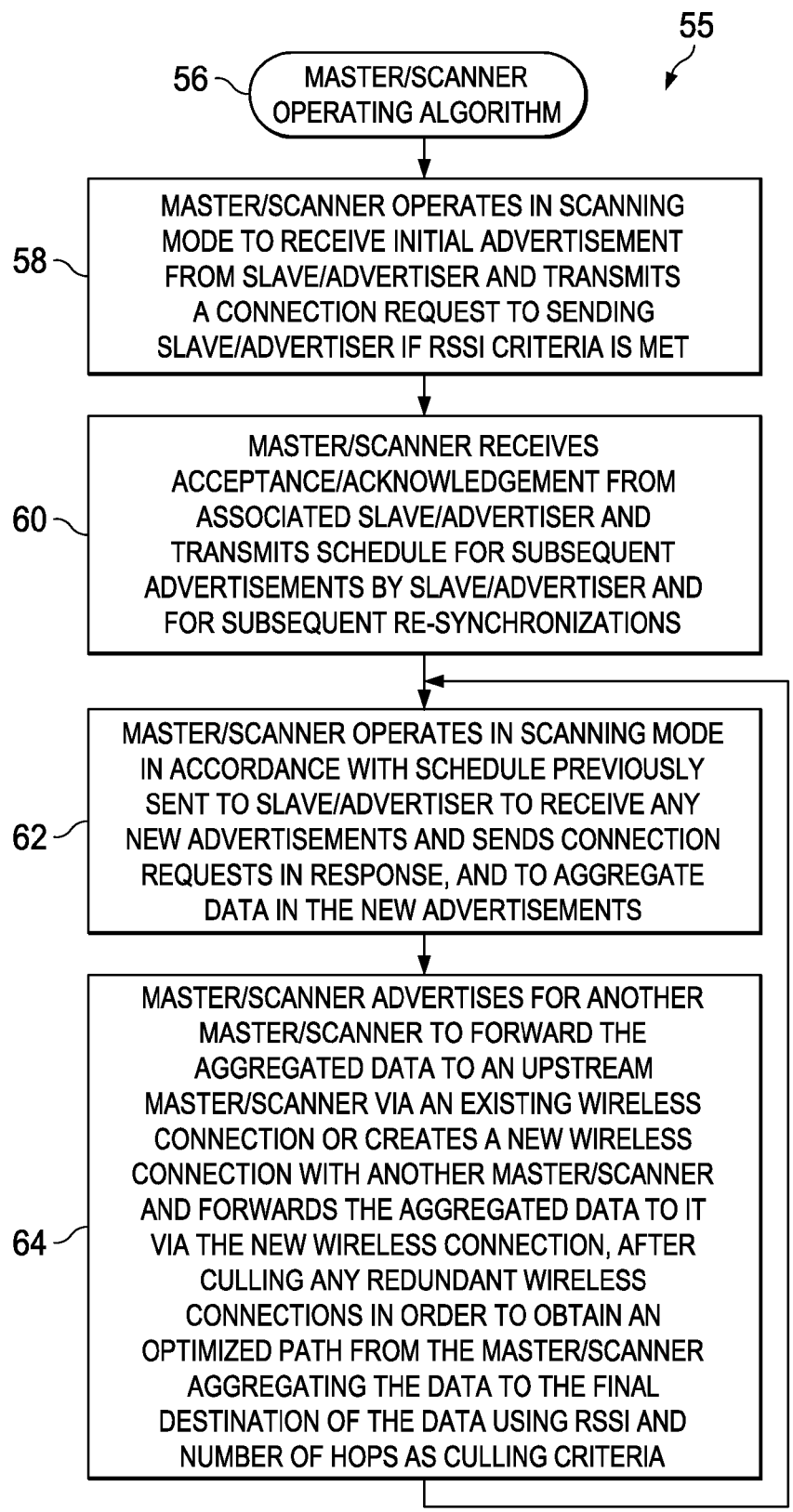
FIG. 10 is a flowchart of an operating algorithm for a master/scanner.

As indicated in the flowchart of FIG. 10, reference numeral 55 designates an embodiment of an operating algorithm stored in block 28-1 of master/scanner 3 of FIG. 7. Master/scanner algorithm 55 begins at label 56, and goes to block 58, wherein the master/scanner 3 of FIG. 7 operates in its scanning mode to receive any initial advertisement if it meets a predetermined RSSI threshold criteria, and if the initial advertisement does meet the RSSI criteria the master/scanner then transmits a connection request to the sending slave/advertiser to enable it to associate with and become synchronized with the master/scanner. The master/scanner 3 of FIG. 7 also operates in its scanning mode to receive any other initial advertisements from other associated slave/advertisers and in response sends connection requests to them to enable them to become associated with the master/scanner. The master/scanner 3 of FIG. 7 also sends connection requests to any of its already-associated slave/advertisers. As indicated in block 60, the master/scanner 3 receives an acceptance/acknowledgment transmitted from any slave/advertiser that has accepted a connection request sent by the master/scanner 3 of FIG. 7 in response to an initial advertisement by that slave/advertiser and then sends a schedule for subsequent advertisements by the slave/advertiser and also sends a predetermined number equal to the number of additional advertisements the slave/advertiser must transmit before initiating a re-synchronization operation with the master/scanner.

Master/Scanner algorithm 55 then goes to block 62, and the master/scanner 3 of FIG. 7 operates in its scanning mode in accordance with the schedule previously sent to the slave/advertiser to receive/detect any new advertisements from the slave/advertiser, send corresponding connection requests, receive acknowledgments or acceptances of the connection requests, and then aggregate data contained in the new advertisement in a data packet. Then, as indicated in block 64, the master/scanner 3 then goes into its advertising mode and advertises for another master/scanner to forward the aggregated data to an upstream (or downstream) master/scanner via an existing wireless connection, or the master/scanner creates a new wireless connection with another master/scanner 3 and forwards the aggregated data to it via the new wireless connection, after culling any redundant wireless connections in order to obtain an optimized wireless path from the master/scanner 3 aggregating the data to the final destination of the data using RSSI and the number of "hops" as culling criteria.

After the foregoing procedure has been repeated to achieve "full connection" (which may include a number of redundant or unnecessary established wireless connections between master/scanners along one or more routes to an upstream destination of an advertisement), then redundant or unnecessary wireless connections are "culled", as subsequently explained with respect to FIG. 5. Data aggregated from the individual slave/advertisers is "piped" upstream through one or more master/scanners, typically until the data reaches an intended upstream network. Essentially the same technique also is used for communication from the upstream network to downstream master/scanners and their respective slave/advertisers.

It should be appreciated that transmitted data includes information capable of identifying intended destinations for the data once it is aggregated. The destination-identifying information may explicitly identify the desired data destinations, or it may be implicit from the order in which the aggregated data is arranged. The aggregated data packet thus includes information that lets upstream master/scanners and slave/advertisers know where the various packets of aggregated data came from and/or the final intended destination for the various packets of aggregated data. Often, the aggregated data is relayed to an upstream external network via one or more master/scanners, then is analyzed, and then is transmitted back from a centralized source to the originating slave/advertiser to accomplish a control function or the like. (However, it is possible for a master/scanner to scan its slave/advertisers in one piconet, and obtain data from them for the purpose of transmitting that data along a route to a master/scanner in another piconet and from it to a slave/advertiser in that piconet.) The described embodiment of the invention is particularly suitable for occupancy sensing and control applications in various industrial control applications.

Figure 5:
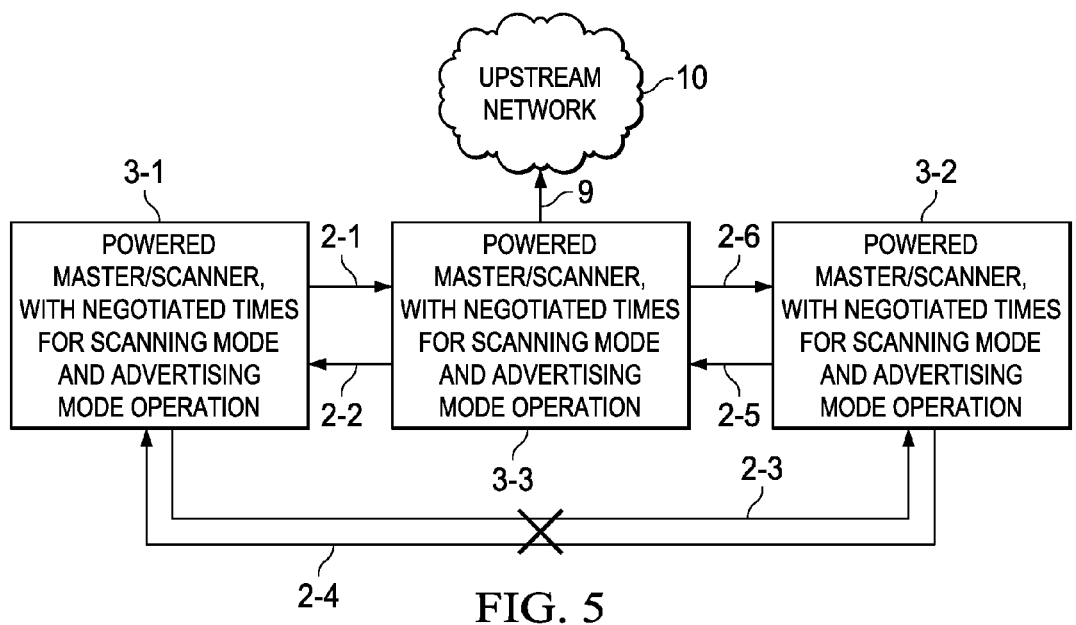
FIG. 5 is a diagram illustrating a route culling process during operation of the piconets of FIG. 2.

FIG. 5 shows a simplified network configuration including multiple established wireless "routes" that provide a "full connection" between three master/scanners 3-1, 3-2, and 3-3 of three separate piconets. (For convenience, the "associated" slave/advertisers in the three piconets are not shown.) Master/scanner 3-1 is wirelessly connected to master/scanner 3-3 by wireless connections 2-1 and 2-2, and also is wirelessly connected to master/scanner 3-2 by wireless connections 2-3 and 2-4. Master/scanner 3-2 is wirelessly connected to master/scanner 3-3 by wireless connections 2-5 and 2-6. Master/scanner 3-3 is connected to an upstream network 10 by means of a connection 9, which may be a wireless or physical connection 9. Connections which are not redundant (or are not required for other reasons) are eliminated on the basis of a culling process based on the highest RSSI level and the least number of "hops" (i.e., re-transmissions of data packet signals required to reach the standard network).

In FIG. 5 the system goes through and culls or eliminates unnecessary wireless connections between master/scanners. Starting with the "fully connected" network of piconets in which some of the established wireless connections are redundant or unnecessary, the culling process removes all but the most desired or optimum wireless connections between individual master/scanners in the various piconets, respectively, until the desired BLE connection between various slave/advertisers and a centralized processor on an upstream network 10 has been achieved. In FIG. 5, the result of culling a redundant wireless path including wireless connections 2-3 and 2-4 between master/scanners 3-1 and 3-2 is indicated by the "X" drawn through wireless connections 2-3 and 2-4.

The culling process can be thought of as starting with a network that includes a tree-like structure of wireless paths some of which are redundantly or non-optimally connected to a trunk of the tree-like structure and removing all but the desired wireless paths so as to establish a single route in which the number of times that the data is re-transmitted to reach its destination is reduced.

The culling criteria, including the RSSI and the number of hops, are applied at each master/scanner node of the possible wireless connection route being evaluated, and the one having the combination of the highest RSSI values and the lowest number of hops between the originating master/scanner and the upstream network 10 is retained, and the remaining paths are eliminated. (A "hop" corresponds to a transmission from one master/scanner to another. For example, if a slave/advertiser sends data to master/scanner 3-1, which then forwards it to master/scanner 3-2 and master/scanner 3-2 then transmits that data to the external network, the route includes 2 hops. That is, the number of hops is equal to the number of data retransmissions from the originating master/scanner to the intended destination of the data.)

The culling is performed locally, rather than in a remote upstream network, in order to eliminate multipaths (i.e., redundant wireless connections) between the master/scanners along a desired route to a specified data destination. For example, if a master/scanner is receiving the same aggregated data from two other master/scanners, it tells one of them to stop forwarding that subset of data. The decision as to which scanner to command to stop redundant transmissions is based on data "loading". For example, if a master/scanner is sending twice as much data as another master/scanner, the one having the larger amount of data loading is told or commanded to stop forwarding the redundant data. The more heavily loaded master/scanner is, in effect, told to stop sending redundant data. For example, if both the first master/scanner 3-1 and the second master/scanner 3-2 are transmitting the same particular set of aggregated data to a third master/scanner 3-3 in FIG. 5 and data loading of the second master/scanner 3-2 is greater than data loading of the first master/scanner 3-1, then the culling includes operating the third master/scanner 3-3 to tell the second master/scanner 3-2 to stop sending the particular set of aggregated data to the third master/scanner 3-3.

Figure 6:
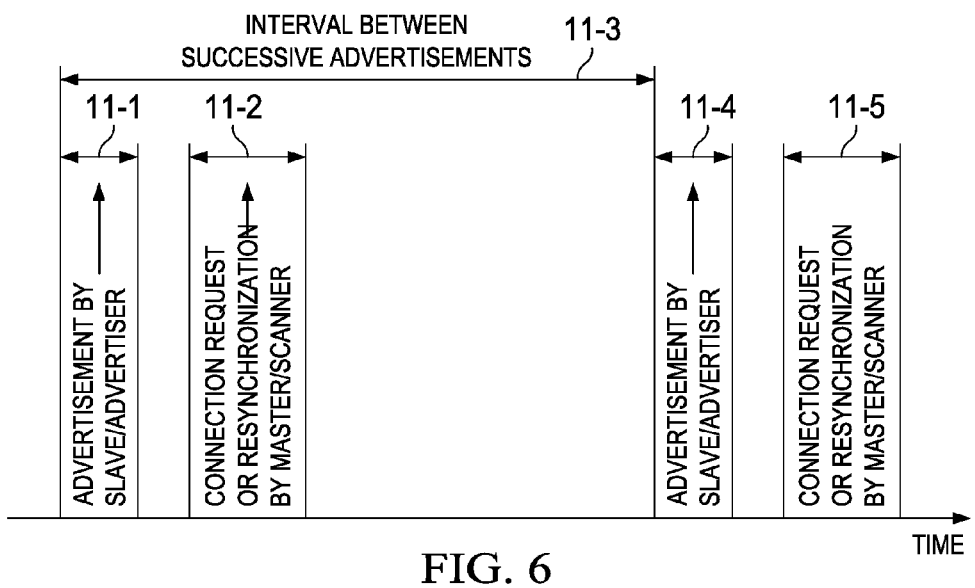
FIG. 6 is a diagram illustrating an acknowledgment and phase synchronization process during operation of the piconets of FIG. 2.

FIG. 6 is a timing diagram that illustrates the time interval between successive advertisements by a slave/advertiser. The slave/advertiser sends out an advertisement during the interval 11-1, and the receiving master/scanner sends a "connection request" during the interval 11-2. The connection request will be accepted by the slave/advertiser if it has data to transmit. Otherwise, the connection request will be rejected by the slave/advertiser. The time interval 11-3 extends from the beginning of the advertisement during the interval 11-1 to the beginning of the next advertisement by the same slave/advertiser during the interval 11-4.

Note that after the first synchronization procedure by a master/scanner with an associated slave/advertiser, the master/scanner establishes in the slave/advertiser a number (e.g., 20) of subsequent advertisements after which the slave/advertiser and master/scanner are required to "resynchronize" in order to adjust or recalibrate the time interval 11-3 between successive advertisements so as to account for or compensate for internal drift between the internal clock signals of the slave/advertiser and the master/scanner during the 20 (in this example) successive advertisements. (The internal clock signal drift occurs because the internal clock signals are based on different crystal oscillators which ordinarily have slightly different oscillating frequencies.) Such clock signal drift is cumulative and therefore will eventually cause the time interval 11-3 to change, possibly (if there is no resynchronization) causing it to overlap with a previously allocated time interval during which the master/scanner must function as an advertiser of aggregated data. The resynchronization allows the slave/advertiser to know when to wirelessly connect with the master/server to initiate the resynchronization procedure.

Scatternet 1 of FIG. 2 has the previously mentioned "dual mode" capability, which supports "classic" Bluetooth standard operation as well as operation in accordance with the BLE low energy standard. In dual mode operation, the multiple the master/scanners which form a "core" of the network have the option of either communicating with each other as previously with respect to FIGS. 3-10 above or communicating with each other using "classic" Bluetooth operation, which is "continuous" in the sense that the communication between the master/scanners not involve operating according to a schedule as previously described. However, in either mode the communication between master/scanners and their associated slave/advertisers always is according to schedules and BLE standards, as previously described.

If the above-mentioned dual mode capability is provided, the first [3-1] and second [3-2] master/scanners may selectively either (1) operate as described above according to a non-continuous predetermined schedule as described above, or (2) communicate aggregated data in a continuous manner without waiting for scheduled times in accordance with the continuous classic standard Bluetooth mode of operation.

Operation with continuous communication between master/scanners has the advantage of providing reduced "latency" (which is the amount of time required for data be propagated through the network) because there is no delay waiting for scheduled communication times between master/scanners. A master/scanner that has just received a message can immediately send it on through the network via other master/scanners. This may be very advantageous if increasing the speed of data through the network more important than reducing its power consumption of the network. This also may be very advantageous if increasing the range (distance) of the network is more important than reducing its power consumption.

The described embodiment of the invention uses standard BLE mechanisms such as advertising and scanning to propagate a message with the intended recipient's MAC (media access control) address. A message is initially advertised or "flooded" through the network. After the "shortest" wireless route between the initiating slave/advertiser and the receiving master/scanner is determined by a series of master/slave connection requests propagating from the message recipient to the message initiator, then subsequent messages between them use directed advertisements only to nodes (master/scanners) along the preferred route determined by analyzing and culling previously established routes. Repeater nodes (i.e., master/scanners) in the described BLE network must advertise or scan continuously when a message is to be propagated in order to minimize the amount of time a recipient node or master/scanner would spend scanning or advertising during communication.

The described embodiment of the invention is interoperable with existing BLE enabled mobile phones/tablets and enables the propagation of messages between mobile wireless devices and sensors without requiring either hardware changes or firmware changes to existing BLE enabled mobiles/tablets. Note that only firmware in a radio or transceiver has to be changed or updated in order to enable use of the described embodiment of the invention. The firmware update can be part of a standard update of the mobile phone/tablet operating system, in which the aforementioned behavior of the BLE functionality is implemented. The described embodiment of the invention provides a method for using a BLE network wherein advertisements by a slave/advertiser are used to transmit data and connection requests between the master/scanner and an associated slave/advertiser and are used for periodic phase synchronization and acknowledgement of the transmitted data. Slave/advertisers are periodically resynchronized to account for drift between internal clock signal signals in master/scanners and associated slave/advertisers. RSSI information and the number of hops required for aggregated data to be propagated to a master/scanner or slave/advertiser node are utilized to establish and then "cull" wireless connections to establish the preferred route between a message-initiating node and a message-receiving node, without use of routing information or routing tables.

Furthermore, the described embodiment of the invention provides a BLE network that requires substantially less power than prior BLE networks, is substantially less expensive, is easier to use, and is interoperable with newer mobile phones.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A BLE (Bluetooth low energy) network comprising:
a first piconet including a first master/scanner and a first group of slave/advertisers for transmitting wireless advertisements and for establishing wireless connections, respectively, with the first master/scanner;
wherein each slave/advertiser in the first group of slave/advertisers for transmitting wireless advertisements can only establish a wireless connection with the first master/scanner;
circuitry in the first master/scanner for
wireless scanning to detect an advertisement transmitted by a first slave/advertiser of the first group and transmitting a connection request in response to the detecting to the first slave/advertiser of the first group, and
transmitting a schedule for subsequent advertisements after an initial advertisement by the first slave/advertiser to thereby complete synchronization of the first master/scanner with the first slave/advertiser; and
circuitry in the first slave/advertiser for
transmitting the initial advertisement, receiving and accepting a resulting connection request, and establishing an association with the first master/scanner, after which the first slave/advertiser goes to sleep in a reduced-power mode,
waking up and transmitting subsequent advertisements according to the schedule, and
accepting resulting connection requests from the first master/scanner when data is available to be advertised, transmitting the available data to the first master/scanner, and going back to sleep;
circuitry in the first master/scanner for transmitting an advertisement containing aggregated data received from the first slave/advertiser to a second master/scanner;
a second piconet including the second master scanner and a second group of low-power slave/advertisers for transmitting wireless advertisements and establishing wireless connections, respectively, with the second master/scanner, the second piconet also including
circuitry in the second master/scanner for
wireless scanning to detect an advertisement transmitted by a second slave/advertiser of the second group and transmitting a connection request in response to the detecting, and
transmitting a schedule for subsequent advertisements after an initial advertisement by the second slave/advertiser; and
circuitry in the second slave/advertiser for
transmitting the initial advertisement, receiving and accepting a resulting connection request, establishing an association with the second master scanner, and then causing the second slave/advertiser to go to sleep in a low-power mode,
waking up and transmitting subsequent advertisements only according to the schedule, and
accepting resulting connection requests from the second master/scanner when data is available to be advertised, transmitting the available data to the first master/scanner, causing the second slave/advertiser to go back to sleep; and
circuitry in the second master/scanner for transmitting an advertisement containing aggregated data received from the first slave/advertiser to a third master/scanner;
wherein the first master/scanner operates to cull a connection with another master/scanner based on RSSI levels of advertisements received from the other master/scanner and the number of hops between master/scanners along a particular route required for aggregated data from the first slave/advertiser of the first group to reach a destination of the aggregated data;
wherein when both the first master/scanner and the second master/scanner are transmitting the same particular set of aggregated data to a third master/scanner and data loading of the second master/scanner is greater than data loading of the first master/scanner, then the culling includes operating the third master/scanner to cause the second master/scanner to stop sending the particular set of aggregated data to the third master/scanner.

2. The BLE low energy network of claim 1 wherein the connection request is the initial connection request and is transmitted by the first master/scanner and is accepted and acknowledged by the first slave/advertiser to establish association and synchronization between the first master/scanner and the first slave/advertiser.

3. The BLE low energy network of claim 2 wherein the first slave/advertiser can only advertise according to the schedule after the association and synchronization have been performed.

4. The BLE low energy network of claim 1 wherein the first slave/advertiser accepts a connection request after the association has been established only when the first slave/advertiser has data available to be advertised.

5. The BLE low energy network of claim 1 wherein the first master/scanner transmits connection requests only if the advertisements meet a predetermined RSSI (received signal strength indicator) requirement.

6. The BLE low energy network of claim 5 wherein accepting a connection request by the slave/advertiser causes it to establish a temporary wireless connection between it and the first master/scanner.

7. The BLE low energy network of claim 1 wherein the schedule requires a predetermined number of allowed advertisements by the first slave/advertiser before it initiates resynchronization of the first slave/advertiser with the first master/scanner to compensate drift between internal clock signals of the first slave advertiser and the first master/scanner, respectively.

\* \* \* \* \*